United States Patent
Campbell et al.

(10) Patent No.: US 7,615,262 B2
(45) Date of Patent: Nov. 10, 2009

(54) LIQUID CRYSTAL MATERIAL, METHOD FOR PRODUCING LIQUID CRYSTAL MATERIAL AND LIQUID CRYSTAL DEVICE

(75) Inventors: Neil Campbell, Gwynedd (GB); Jun Yamamoto, Nishitokyo (JP); Hiroshi Yokoyama, Tsukuba (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 185 days.

(21) Appl. No.: 11/572,500

(22) PCT Filed: Jul. 15, 2005

(86) PCT No.: PCT/JP2005/013123
§ 371 (c)(1),
(2), (4) Date: Apr. 3, 2007

(87) PCT Pub. No.: WO2006/011377
PCT Pub. Date: Feb. 2, 2006

(65) Prior Publication Data
US 2008/0266512 A1    Oct. 30, 2008

(30) Foreign Application Priority Data
Jul. 27, 2004    (JP) .............................. 2004-218656

(51) Int. Cl.
*C09K 19/34*    (2006.01)
*C09K 19/30*    (2006.01)
*C07C 43/192*    (2006.01)
*C07C 23/10*    (2006.01)
*G02F 1/13*    (2006.01)

(52) U.S. Cl. .............. 428/1.1; 252/299.61; 252/299.63; 568/661; 568/664; 568/669; 570/128; 570/131; 349/182

(58) Field of Classification Search ............ 252/299.61, 252/299.63; 570/128, 131; 568/664, 667, 568/661, 669; 428/1.1; 349/182
See application file for complete search history.

(56) References Cited

U.S. PATENT DOCUMENTS 4,791,139 A * 12/1988 Bushell et al. .............. 514/721
(Continued)

FOREIGN PATENT DOCUMENTS

DE           42 23 058           1/1994
(Continued)

OTHER PUBLICATIONS

Raviol, A. et al.,"The Effect of Molecular Association and Tube Dilation on the Rotational Viscosity and Rotational Diffusion in Nematic Liquid Crystals", J. Chem. Phys., vol. 103, No. 9, pp. 3788-3794, 1995.
(Continued)

*Primary Examiner*—Shean C Wu
(74) *Attorney, Agent, or Firm*—Oblon, Spivak, McClelland, Maier & Neustadt, L.L.P.

(57) ABSTRACT

The present invention provides a liquid crystal material, method for producing the liquid crystal material, and liquid crystal device thereof which shows low light absorption in the ultraviolet light region. A compound of formula (I)

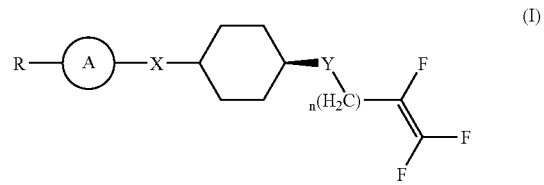

wherein R is an alkyl or alkenyl group which is optionally interposed with one or more oxygen or sulphur atoms, Y is independently selected from oxygen or sulphur, n is an integer of from 2 to 8, X is a direct bond, $C_{1-4}$alkylene or $C_{2-4}$alkenylene, and A is selected from a various specified ring structures. The liquid crystal material (compounds) are of low birefringence and are U.V. stable and are useful in liquid crystal devices that need low birefringence such as reflective displays, or which are exposed to high levels of U.V. light such as phosphor display cells.

19 Claims, 1 Drawing Sheet

U.S. PATENT DOCUMENTS

| | | | |
|---|---|---|---|
| 7,097,887 B2 * | 8/2006 | Kelly et al. | 428/1.1 |
| 7,396,487 B2 * | 7/2008 | Kelly et al. | 252/299.63 |
| 2004/0149957 A1 * | 8/2004 | Kelly et al. | 252/299.63 |
| 2005/0072963 A1 * | 4/2005 | Kelly et al. | 252/299.63 |

FOREIGN PATENT DOCUMENTS

| | | |
|---|---|---|
| DE | 42 23 501 | 1/1994 |
| JP | 6 306361 | 11/1994 |
| WO | 02 081418 | 10/2002 |

OTHER PUBLICATIONS

Kirsch, Peer et al.,"Design and Synthesis of Novel trans-1,3-Dioxane Based Liquid Crystals", Freiburger Arbeitstagung Fluessigkristalle, 1998.

* cited by examiner

LIQUID CRYSTAL MATERIAL, METHOD FOR PRODUCING LIQUID CRYSTAL MATERIAL AND LIQUID CRYSTAL DEVICE

TECHNICAL FIELD

The present invention relates to a liquid crystal material, and more particularly, relates to novel liquid crystal compounds and liquid crystal mixture which are suitable for reflective-type liquid crystal device or phosphor liquid crystal device, and have the properties of low ultraviolet absorption, low birefringence, and low viscosity. The present invention further relates to method for producing the liquid crystal compounds and the liquid crystal mixture, and liquid crystal device thereof.

BACKGROUND ART

The present invention relates to novel compounds, which have the properties of liquid crystals and are stable to u.v. radiation, together with process for their production and liquid crystal devices (LCDs) incorporating them.

The term "Liquid Crystals" is well known. It refers to compounds which, as a result of their molecular structure, will align themselves in a similar orientation, preferably at working temperatures, for example of from −40 to 200° C. Liquid crystal materials are well known for their use in electro-optical display devices, such as PDA, mobile phones laptop computer screens, watches and the like. The most commonly used type of liquid crystal material is that which shows a nematic liquid crystalline phase. Desirable characteristics in a nematic liquid crystal material include a high nematic to isotropic transition temperature, a low solid crystal to nematic transition temperature, and the absence of smectic (S) phases.

Other desirable characteristics include low viscosity, ease of manufacture, chemical and thermal stability. Nematic liquid crystal materials used in LCDs generally consist of a mixture of chemical compounds.

Conventional techniques of fluorinated liquid crystal are disclosed in the following patent documents 1 and 2. The present invention succeeded in producing liquid crystal material different from that disclosed in the documents.

Patent document 1: EP-B-418362

Patent document 2: EP-B-732330

DISCLOSURE OF INVENTION

In view of the above, it is an object of the present invention to provide a liquid crystal material which has a property of low light absorption in ultraviolet region, and is suitable for reflective-type liquid crystal display device (AM-TFT-LCD) or phosphor-type liquid crystal display device (PL-LCD) whose application has been newly studied. Further, it is an object of the present invention to provide method for producing the liquid crystal material, and liquid crystal device thereof.

To achieve the above objects, the present invention has the following characteristics:

[1] A liquid crystal compound of formula (I)

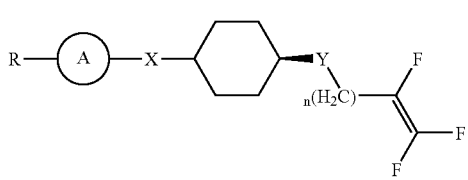

(I)

wherein R is an alkyl or alkenyl group which is optionally interposed with one or more oxygen or sulphur atoms, Y is independently selected from oxygen or sulphur, n is an integer of from 2 to 8, X is a direct bond, $C_{1-4}$alkylene or $C_{2-4}$alkenylene chain, and A is group comprising of one or two rings, they are either bonded directly or by way of a $C_{1-4}$alkylene or $C_{2-4}$alkenylene group.

[2] In the compound according to the above item [1], the group A in formula (I) is selected from a group of formula (i), (ii), (iii), (iv) or (v)

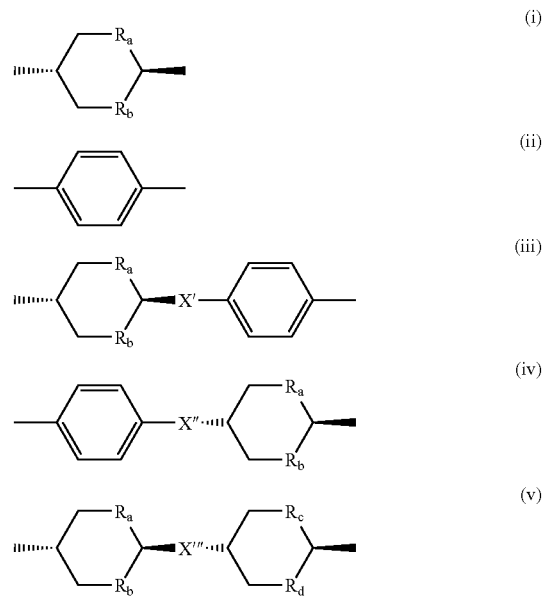

where X', X" and X'" are each selected from a direct bond, $C_{1-4}$alkylene or $C_{2-4}$alkenylene chain, and each group $R_a$, $R_b$, $R_c$ and $R_d$ are independently selected from $CH_2$ or oxygen.

[3] In the compound according to the above item [2], $R_a$, $R_b$, $R_c$ and $R_d$ where present, are $CH_2$ groups.

[4] In the compound according to any one of the above items [1] to [3], Y is oxygen.

[5] In the compound according to any one of the above items [1] to [4], n is 2.

[6] In the compound according to any one of the above items [1] to [5], X is directly bonded or a $C_{1-2}$alkylene chain.

[7] In the compound according to the above item [6], X is a direct bond.

[8] In the compound according to any one of the above items [1] to [5], X is a $C_{2-4}$alkenylene chain of formula (vi) (vii) or (viii).

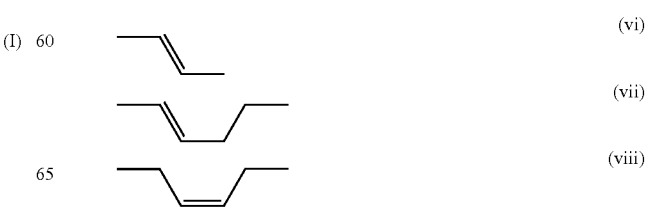

[9] In the compound according to any one of the above items [1] to [8] which is of formula (IA)

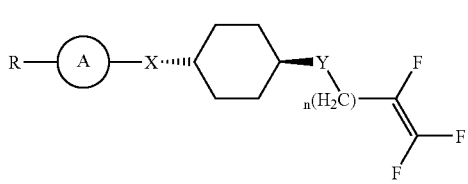
(IA)

where R, A, X, Y and n are as defined in the above item [1].

[10] In the compound according to any one of the above items [1] to [9], R is a straight chain $C_{1-6}$alkyl group which optionally contains one or two oxygen or sulphur atoms.

[11] In the compound according to any one of the above items [1] to [9], R is a $C_{2-10}$alkenyl group.

[12] In the compound according to the above item [11], the alkenyl group contains two double bonds.

[13] In the compound according to the above item [11], the alkenyl group is a diene of formula (ix)

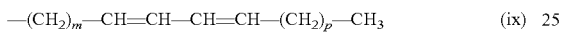
(ix)

where m and p are 0 or an integer of from 1-5, providing that m+p does not exceed 5.

[14] In the compound according to any one of the above items [1] to [13] which is a compound of formula (II)

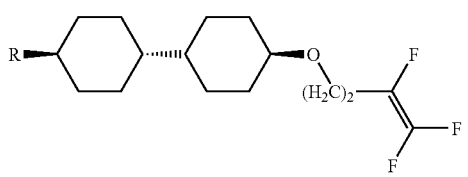
(II)

where R is as defined in the above item [1].

[15] A method for producing the compound according to any one of the above items [1] to [14], which comprises reacting a compound of formula (III)

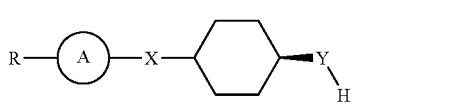
(III)

where R, A, X and Y are as defined in relation to formula (I); with a compound of formula (IV)

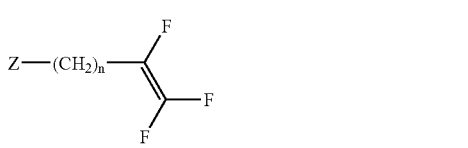
(IV)

where n is defined as in the above item [1] and Z is a leaving group.

[16] A liquid crystal mixture including a liquid crystal compound according to any one of the above items [1] to [15] and another liquid crystal compound which may or may not comprise a compound of formula (I).

[17] A liquid crystal device including a compound according to any one of the above items [1] to [14] or a mixture according to the above item [16].

[18] In the liquid crystal device according to the above item [17], which includes a display cell including a layer of liquid crystal material wherein the liquid crystal material includes a compound of formula (I) as defined in the above item [1] or mixture as defined in the above item [16], means for addressing the liquid crystal material so as to allow light to pass through it when appropriately addressed, and an emitting layer comprising phosphor elements, arranged to receive light passing through the liquid crystal layer.

BEST MODE FOR CARRYING OUT THE INVENTION

Figure 1:
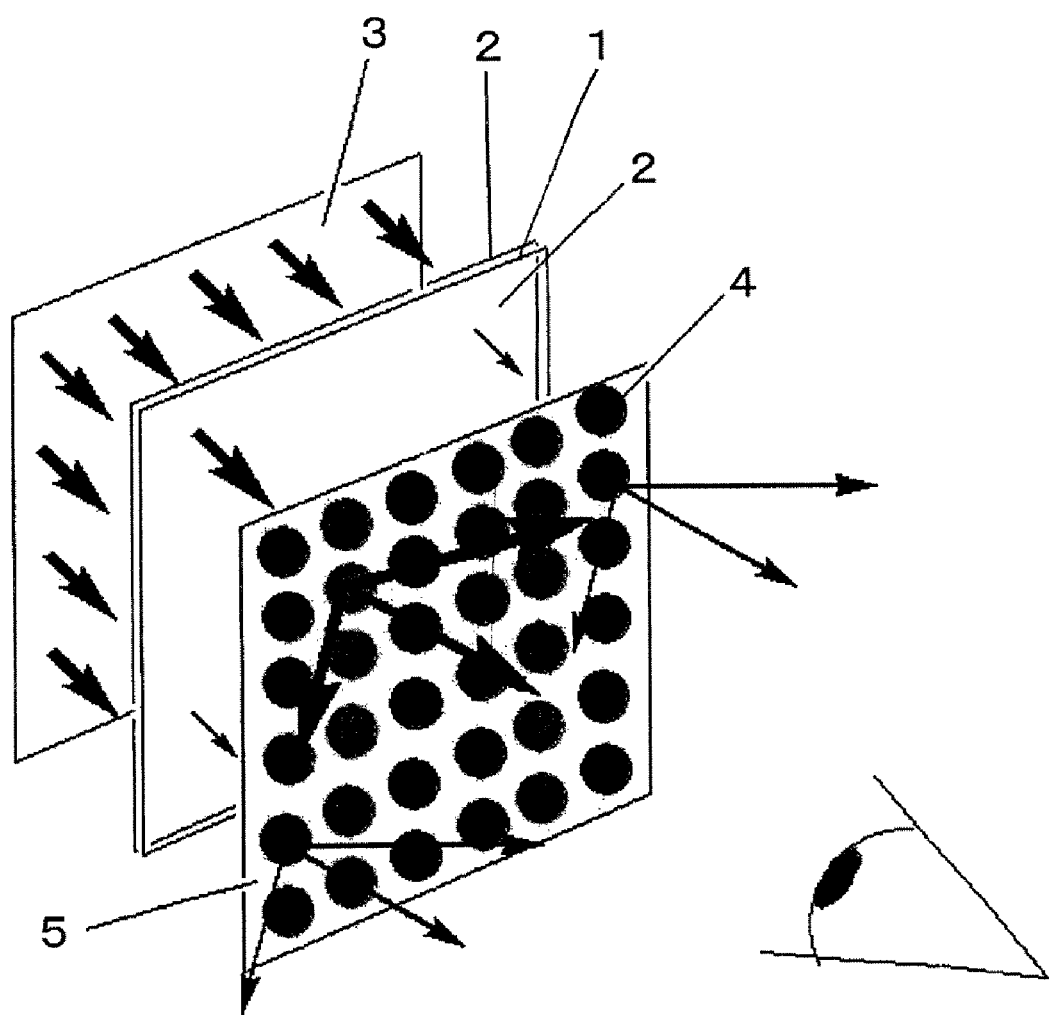
FIG. 1 is a schematic view of a device having solid-state display device according to the embodiment of the present invention.

Composition of novel compounds of liquid crystal which only show a nematic liquid crystalline phase has been succeeded by the present invention. The liquid crystal compounds have the properties such as low rotational viscosity, low birefringence, stability to u.v. radiation, and positive dielectric anisotropy. Consequently, the application development in AM-TFT-LCD and PL-LCD can be expected.

Embodiment

Hereinafter, embodiments according to the present invention will be described in detail.

The present invention provides a compound of formula (I)

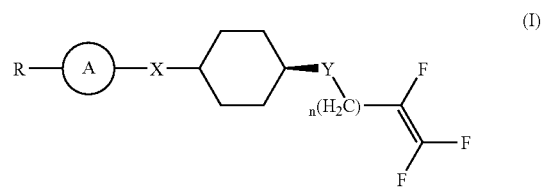
(I)

wherein R is an alkyl or alkenyl group which is optionally interposed with one or more oxygen or sulphur atoms, Y is independently selected from oxygen or sulphur, n is an integer of from 2 to 8, X is a direct bond, $C_{1-4}$alkylene or $C_{2-4}$alkenylene, and A is group comprising of one or two rings, they are either bonded directly or by way of a $C_{1-4}$alkylene or $C_{2-4}$alkenylene group.

The terms will be described herein.

The term "alkyl" will hereafter refer to straight or branched chain alkyl groups, containing up to 20, more suitably up to 10 and preferably up to 6 carbon atoms. The term "alkylene" refers to alkyl groups that are divalent and "cycloalkyl" refers to alkyl groups which have at least 3 carbon atoms, and which are cyclic in structure. The term "alkenyl" refers to straight or branched unsaturated chains having 2 to 20 and preferably 2 to 10 carbon atoms. The term "aryl" refers to aromatic rings such as phenyl and naphthyl, but preferably phenyl. The term "heterocyclic groups" refer to rings, which suitably contain from 4 to 8 atoms, up to three of which are heteroatoms selected from oxygen, nitrogen and sulphur. They may be saturated or unsaturated, but preferably saturated.

Suitably, rings in group A are para substituted, and where they are saturated the substituents are preferably in a trans relationship with each other. Particularly preferred examples of group A in formula (I) are groups of formula (i), (ii), (iii), (iv) or (v)

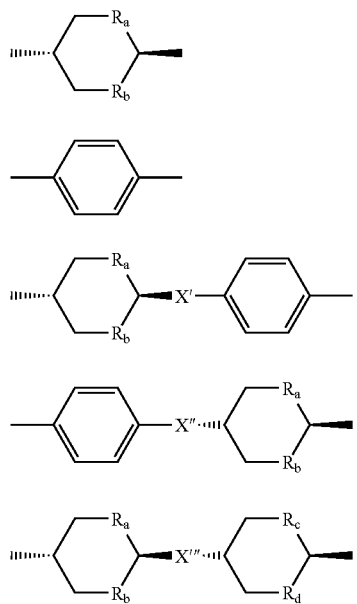

where X', X" and X'" are each selected from a direct bond, $C_{1-4}$alkylene or $C_{2-4}$alkenylene chain, and each group $R_a$, $R_b$, $R_c$ and $R_d$ are independently selected from $CH_2$ or oxygen. In particular where one of $R_a$ or $R_b$ or $R_c$ or $R_d$ is oxygen, the other is also oxygen so that the group A is or includes a dioxane ring. Though preferably $R_a$, $R_b$, $R_c$ and $R_d$ are present as $CH_2$ groups.

Suitably Y is oxygen and in the particularly preferred embodiment, n is the integer 2. Preferably, X is a direct bond or a $C_{1-2}$alkylene chain, and most preferably X is a direct bond.

Where X is a $C_{2-4}$alkenylene chain, it is suitably of a group of sub-formula (vi), (vii) or (viii).

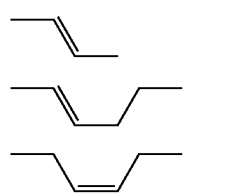

The cyclohexyl ring illustrated in formula (I) is suitably in the trans configuration. Therefore, in particular, the compound of formula (I) is suitably a compound of formula (IA)

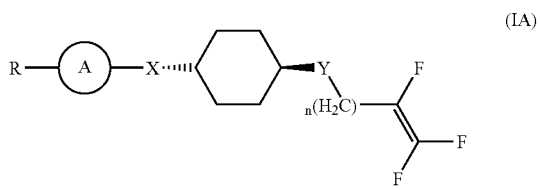

wherein R is an alkyl or alkenyl group which is optionally interposed with one or more oxygen or sulphur atoms, Y is independently selected from oxygen or sulphur, n is an integer of from 2 to 8, X is a direct bond, $C_{1-4}$alkylene or $C_{2-4}$alkenylene chain, and A is group comprising of one or two rings, they are either bonded directly or by way of a $C_{1-4}$alkylene or $C_{2-4}$alkenylene group.

In a preferred embodiment, R is a straight chain $C_{1-6}$alkyl group and most preferably a $C_{3-5}$alkyl group, which optionally contains one or two oxygen or sulphur atoms. A particular example of the group R is a group of formula (x)

where m is an integer from 1 to 5, Y" and Y'" are independently selected from oxygen or sulphur and $R^2$ is alkyl, in particularly $C_{1-4}$alkyl. Preferably m is 2. Preferably Y" and Y'" are oxygen.

Other particular examples of groups R are $C_{3-5}$alkyl.

In an alternative embodiment, R is an alkenyl group and in particular a $C_{2-10}$alkenyl group. Suitably the alkenyl group contains two or more carbon-carbon double bonds, and is preferably a diene of formula (ix)

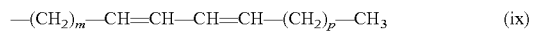

where m and p are 0 or an integer of from 1-5, providing that m+p does not exceed 5. Preferably m and p are 0.

Particularly suitable rings A in formula (I) are groups of sub-formula (i), (ii) and (v), and preferred rings A are groups of sub-formula (i). In groups of sub-formula (iii), (iv) and (v), X', X" and X'" are suitably direct bonds or $C_{1-2}$alkylene groups. Particularly, these are direct bonds. Where these are $C_{2-4}$alkylene groups, these are suitably selected from groups (vi), (vii) or (viii) as listed above in relation to X. Therefore examples of compounds of formula (I) are compounds of formula (II)

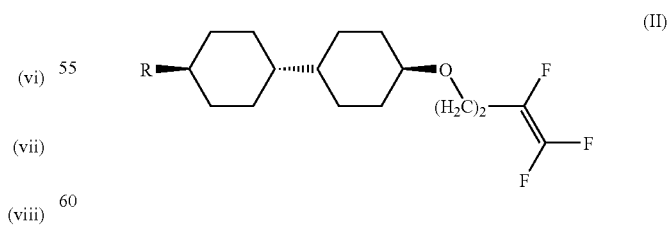

wherein R is an alkyl or alkenyl group which is optionally interposed with one or more oxygen or sulphur atoms.

The liquid crystal compounds of the present invention described above may be used alone or in a mixture with other liquid crystal compounds which may or may not comprise compounds of formula (I).

The compounds of the present invention have a very low birefringence (due to the minimization of the number of polarizable structure elements, such as carbon-carbon double or triple bonds within the molecule) and rotational viscosity due to the small linear shape and minimization of attracting functionalities. These properties make them particularly useful in reflective liquid crystalline displays that require a low birefringence. These compounds are particularly suitable because the largest contribution to the overall power consumption of a LCD (about 70-90%) is due to the backlight used to illuminate the display. Recently, many portable devices, such as small notebook computers, video games, or personal digital assistants (PDAs, such as electronic notebooks and calendars), have therefore been equipped with reflective TFT displays in order to increase the battery lifetime. Since the optical path of the reflected light through a reflective display is different from a usual TN-LCD, there are other requirements for the birefringence of the liquid crystal compounds. While a standard TFT display requires a Δn value of roughly around 0.1, an optimal picture quality reflective with TFT display compounds need Δn values around 0.06, such as those described in the above patent document 1, DE-B-19525314, and the above patent document 2.

Here, Δn represents the magnitude of birefringence of the liquid crystal material, which is defined by $\Delta n = n_e - n_o$ where $n_e$ represents the index when longitudinal axis of the molecule and polarization of light are parallel and $n_o$ represents the index when longitudinal axis of the molecule and polarization of light are perpendicular. The longitudinal axis aligns with electric field when Δn is positive, and the longitudinal axis aligns perpendicular to electric field when Δn is negative. Consequently, the liquid crystal material having positive Δn is mainly used for display devices.

The liquid crystal compounds or mixtures with containing these compounds of the present invention may be used in any of the known types of nematic liquid crystal device, for example: the twisted nematic (TN) device, which may be directly, multiplexed or have an active matrix addressing system.

The liquid crystal compounds of the present invention also have good stability towards the presence of radiation, such as ultraviolet radiation. In particular they do not absorb radiation at the wavelengths used in many liquid crystal devices. These properties make them particularly useful in liquid crystalline displays that are exposed to high levels of ultraviolet radiation, such as those used in outdoor displays. In addition, they may be utilized in conjunction with phosphorescent substances or phosphor layer liquid crystal devices, such as those described in U.S. Pat. No. 4,830,469, WO 95/27920, EP-A-185495 and European Patent No. 0755532.

These devices are particularly suitable for display cells and especially colour display cells as they overcome problems associated with the use of liquid crystals as shutters for transmitting light to a viewer. The light scattering or birefringence properties of these compounds are useful in this respect and may be controlled by application of an electric field. However the liquid crystal material is sensitive to the angle at which light passes through it, and therefore there may be difficulties with viewing angle when these are viewed directly.

The above mentioned problems of viewing angle in these devices can be overcome by the direction of light from the light source, usually an ultraviolet light source, through the liquid crystal cell onto self radiating elements or phosphors, which, on being activated by the light reaching them through the liquid crystal cell, emit light. This process being an emissive one, rather than that of a passive liquid crystal device, results in large viewing angles. Each phosphor can be arranged in a pixel architecture comprising of a group of red, blue and green phosphors to form each individual pixel in a device. Thus, using these three types of phosphors and the liquid crystal cell as shutter system to control the intensity of light allowed to transmit through the device, pixels can emit light of any colour depending upon their relative stimulation, allowing for a full colour display with good contrast and viewing angle to be produced.

Thus, a preferred liquid crystal device according to the present invention is a display cell comprising of a layer of liquid crystal material wherein the liquid crystal material comprises of or is a mixture containing compounds of formula (I), means for addressing the liquid crystal material so as to allow light to pass through it when appropriately addressed, and an emitting layer comprising phosphor elements arranged to receive light passing through the liquid crystal layer.

FIG. 1 is a schematic view of a device having solid-state display device according to the embodiment of the present invention. The device illustrated here are an application example of the present invention, which may be arranged differently depending upon the intended application.

In this FIGURE, reference numeral 1 denotes liquid crystal material (liquid crystal compounds, liquid crystal mixture), reference numeral 2 denotes a transparent substrate plate, reference numeral 3 denotes a light source, reference numeral 4 denotes phosphors, and reference numeral 5 denotes an emitting layer.

Suitably in these devices, the liquid crystal material (liquid crystal compounds, liquid crystal mixture) 1 is contained between two parallel, spatially separated transparent substrate plates 2, either in individual cells or in a continuous panel. Liquid crystal material 1, such as the compound or a mixture containing the present invention is provided in the cell and the orientation is controllable by addressing means, such as electrodes arranged on either side of the layer (not shown). Light from a light source 3 is supplied in the direction of the arrows, and is either internally reflected by the liquid crystal material 1 or diverted to the phosphors 4 on an emitting layer 5, depending upon the activation of the liquid crystal material 1. The phosphors 4 may then emit light at the preferred viewing angle.

Devices may also contain polarisers and/or dichroic ultraviolet light absorbers (as described in U.S. Pat. No. 4,830,469).

A particularly preferred device further comprises means for collimating activating light towards the phosphors. Various arrangements for such collimating means are described in WO 95/27920. They include lenses, which may be arranged in or on one of the layers.

The ultraviolet light source can be supplied to the liquid crystal layer, either directly from behind or from the edge using for example the transparent backing plate as a light guide. The anchoring methods in which to control the orientation of the liquid crystal material within each cell or region of the panel are a well-known art. As a result, light may or may not be directed onto a particular phosphor element, which is then either activated to emit light or remain dark, respectively. By control of the anchoring means, each pixel point has individual visible light output characteristics at any given point in time.

These displays may also be used for computer or television screens, which require many hundreds of thousands of individual pixels, which control the amount of red, green and blue light reaching a very small area of the screen, for example 100 μm or less. In such cases, one of the electrodes used to address the liquid crystal material may be connected together in columns, and the other connected in rows (where rows and columns are perpendicular to each other) in order to reduce the number of electrical connections required. However, in order to ensure that pixels are controlled individually, these need to be multiplexed as understood in the art. Multiplexing can be achieved by applying a voltage that cycles between the desired voltage and zero many time per second. As each row receives the required voltage, a positive or negative voltage is applied to each column so that individual pixels within the row are addressed in the required manner. This means that the liquid crystal of all the "on" pixels will subject to a voltage in excess of the threshold voltage for that compound. All rows in the display are scanned to refresh the pixels.

The production process of the compounds according to the present invention is shown below.

Compound of formula (I) are prepared by reacting a compound of formula (III)

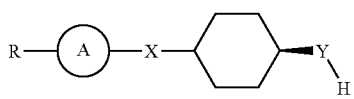

(III)

where R, A, X and Y are as defined in relation to formula (I); with a compound of formula (IV)

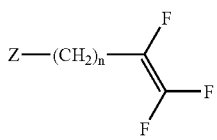

(IV)

where n is defined as in claim 1 and Z is a leaving group.

The reaction is suitably effected in an organic solvent such as tetrahydrofuran in the presence of a strong base such as an alkali metal hydride for instance, sodium hydride. Suitable leaving group Z include halo such as chloro, bromo or iodo, mesylate and tosylate, and in particular are halo groups such as bromo. Compounds of formula (III) are either known compounds or they can be prepared from known compounds by conventional methods. The preparation of these compounds is only one step using known compounds yielding a relatively cheap reaction allowing for ease of scale-up for commercial production.

EXPERIMENT

Preparation of trans, trans-4-Propyl-4'-(3,4,4-trifluo-robut-3-enyloxy)bicyclohexyl (Compound 13 in Below-Mentioned Table 1.)

A solution of trans-4-(trans-4-propylcyclohexyl)-1-cyclohexanol (0.50 g, $2.23 \times 10^{-3}$ mol) in terahydrofuran (25 cm$^3$) was added dropwise to a suspension of sodium hydride (0.06 g, $2.68 \times 10^{-3}$ mol) in tetrahydrofuran (25 cm$^3$) at room temperature under a nitrogen atmosphere. The solution was then left to stir (2 hrs) before 4-bromo-1,1,2-trifluoro-1-butene (0.42 g, $2.23 \times 10^{-3}$ mol) was added and the reaction mixture then stirred (48 hrs). Methanol (20 cm$^3$) was then added to the reaction mixture followed by water (75 cm$^3$). The product was then extracted into ether ($3 \times 50$ cm$^3$) and the combined organic layers were washed with brine ($2 \times 50$ cm$^3$) and dried over magnesium sulphate. The solution was then filtered and the solvent removed under reduced pressure and the crude product purified by column chromatography on silica gel using 3:7 ethylacetate-hexane mixture as eluent and recrystallisation from cold propanone, to yield the desired product as a white crystalline solid. 0.18 g (25%) OM: Cr 80 N (55) I DSC Cr 79.1 I (heating), I 54.8 N 29.0 Cr (cooling).

The properties of the liquid crystal compounds are described next.

The properties of the liquid crystal compounds of this invention where tested using conventional methods. In particular the melting and clearing points of the compounds of the invention where determined and compared to similar known compounds. The results are shown in table 1.

TABLE 1

C$_3$H$_7$—⟨⟩—⟨⟩—R

| No. | R | Cr | S$_B$ | N | I |
|---|---|---|---|---|---|
| 1 | ∖∕ | • 23 | • 96 | — | • |
| 2 | —O∖∕ | • 32 | • 74 | — | • |
| 3 | ∖∕—O | • 15 | • 42 | — | • |
| 4 | ∖∕—O— | • 25 | • 85 | — | • |
| 5 | —O∖∕F | • 61 | — | — | • |
| 6 | —O∖∕Br | • 45 | — | (• 34) | • |
| 7 | —O∖∕OH | • 86 | (• 83) | — | • |
| 8 | —O∖∕O— | • 47 | — | (• 44) | • |
| 9 | ∖∕= | • −16 | • 89 | — | • |
| 10 | ∖∕= | • 44 | • 75 | • 96 | • |
| 11 | —O∖∕= | • 60 | — | (• 47) | • |
| 12 | ∖∕=O— | • 30 | • 70 | • 73 | • |
| 13 | —O∖∕=CF$_2$F | • 80 | — | (• 55) | • |

Table 1 shows that for the trans, trans-4-propyl-4'-R-bicyclohexyl core compound the effect of the position and number of polar or electron rich functionalities in the end chain on the liquid crystal phase formation. All members of the series that incorporate an oxygen (polar group) in the 1-position and either another polar or electron rich functionality in the 4-position form a nematic only liquid crystal compound with the absence of any high ordered smectic B phases. Compound 5 did not exhibit a nematic phase, as the fluorine polar functionality is too small unlike the larger bromo analogue (6). Also compound 7 did not form a nematic phase due to H-bonding from the terminal alcohol functionality, this attracting functionality leads to the stabilization of a high ordered Smectic B phase. All the rest of the compounds in Table 1 either are or contain a smectic B phase.

The present invention incorporates both an oxygen (polar group) in the 1-position and a polar and electron rich group at the 4-position in the end chain resulting in a monotropic nematic phase with a relatively broad nematic temperature range.

The physical properties the mixtures described were evaluated using conventional methods.

Mixtures of trans, trans-4-Propyl-4'-(3,4,4-trifluorobut-3-enyloxy)bicyclohexyl (13) in a standard room temperature nematic liquid crystal mixture ZLI-1083 were made and the phase behaviour, threshold voltage, permittivities, rotational viscosity and birefringence determined. The mixtures composition and phase behaviour is listed in table 2. None of the mixtures exhibited high order smectic phases.

TABLE 2

| Mixture No. | Mixture Composition | N—I (° C.) | I—N (° C.) | $V_{th}$ |
|---|---|---|---|---|
| M1 | ZLI-1083 | 53 | 51 | 1.3 V |
| M2 | 10% wt Compound 13 in ZLI-1083 | 49 | 48 | 1.6 V |
| M3 | 20% wt Compound 13 in ZLI-1083 | 47 | 46 | 1.7 V |

Birefringence of the mixtures measured at 25° C. in a 0.7 mm spaced wedge cell is given below in table 3. The final extrapolated birefringence was calculated for compound 13 and it was shown to low.

TABLE 3

| Mixture No. | Mixture Composition | $n_e$ | $n_o$ | $\Delta n$ |
|---|---|---|---|---|
| M1 | ZLI-1083 | 1.5813 | 1.4713 | 0.1100 |
| M2 | 10% Compound 13 in ZLI-1083 | 1.5734 | 1.4713 | 0.1021 |
| M3 | 20% Compound 13 in ZLI-1083 | 1.5655 | 1.4713 | 0.0942 |
|  | Compound 13 |  |  | 0.067 |

The permittivities of the mixtures are shown in table 4.

TABLE 4

| Mixture No. | Mixture Composition | $\epsilon_\parallel$ | $\epsilon_\perp$ | $\Delta n$ |
|---|---|---|---|---|
| M1 | ZLI-1083 |  |  |  |
| M2 | 10% Compound 13 in ZLI-1083 |  |  |  |
| M3 | 20% Compound 13 in ZLI-1083 |  |  |  |
|  | Compound 13 |  |  |  |

Comparison of physical properties of compound 13 with other known liquid crystal compounds used for similar applications as shown in table 5.

TABLE 5

| No. | Structure | Mesophases | $T_{NI\ extr}$ | $\Delta\epsilon$ | $\Delta n$ | $\gamma_1$ |
|---|---|---|---|---|---|---|
| 14 |  | Cr 35 $S_B$ (33) I | −20.5 | 5.3 | 0.051 | 99 |
| 15 |  | Cr 33 N (18.2) I | −13.2 | 6.9 | 0.059 | 89 |
| 16 |  | Cr 34 N (31.0) I | 15.1 | 5.6 | 0.065 | 65 |
| 13 |  | Cr 80 N (54.9) I | 18.6 |  | 0.067 |  |

Photolumenecent (PL) liquid crystal devices, which utilize a high intensity u.v. backlight, work within the 300-400 nm wave length range. Thus liquid crystal compounds used in these devices should be chemically stable when subjected to this wavelength of radiation and more suitably not absorb u.v. within this range. The wavelength of u.v absorbency was tested for compound 13 and compared to a standard or 4-cyano-4'-proplybiphenyl (5CB) as shown in table 6. Compound 13 is shown not to absorb u.v. radiation within the working range of standard PL liquid crystal devices, therefore a possible useful compound for use alone or as a component of a mixture in these types of devices.

TABLE 6

| No. | Mixture Composition | Wave length of absorbance |
|---|---|---|
| 17 | | 323 nm |
| 13 | | 261 nm |

The present invention is not limited to the examples described above, and various modifications may be performed without departing from the spirit and the scope of the present invention and may not be excluded therefrom.

According to the present invention, advantages as described below can be achieved.

Composition of novel compounds of liquid crystal which only show a nematic liquid crystalline phase has been succeeded by the present invention. The liquid crystal compounds have the properties such as low rotational viscosity, low birefringence, stability to u.v. radiation, positive dielectric anisotropy and the like. Consequently, the application development in AM-TFT-LCD and PL-LCD can be expected.

In particular, the compounds of the present invention have advantages such as wide temperature range which shows nematic phase, good birefringence suitable in a range for the practical application, high stability to the ultraviolet light, positive dielectric anisotropy. Since the composition method starts with the low cost materials and employs simple composition process, the compounds of the present invention are advantageous in terms of practical usage.

INDUSTRIAL APPLICABILITY

The present invention is suitably applied to liquid crystal compounds, liquid crystal mixture, and liquid crystal device which have the properties of low ultraviolet absorption, low birefringence, and low viscosity. In particular, the present invention is expected to be applied to reflective-type liquid crystal display device (AM-TFT-LCD) or phosphor-type liquid crystal display device (PL-LCD) whose application has been newly studied.

The invention claimed is:

1. A liquid crystal compound of formula (I)

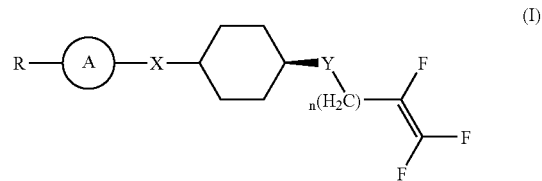

wherein R is an alkyl or alkenyl group which is optionally interposed with one or more oxygen or sulphur atoms, Y is independently selected from oxygen or sulphur, n is an integer of from 2 to 8, X is a direct bond, $C_{1-4}$ alkylene or $C_{2-4}$ alkenylene, and A is group comprising of one or two rings, they are either bonded directly or by way of a $C_{1-4}$ alkylene or $C_{2-4}$ alkenylene group.

2. A compound according to claim 1 wherein the group A in formula (I) is selected from a group of formula (I), (ii), (iii), (iv) or (v)

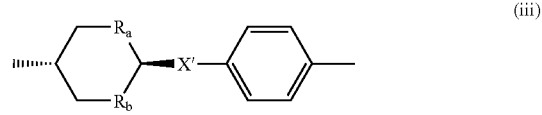

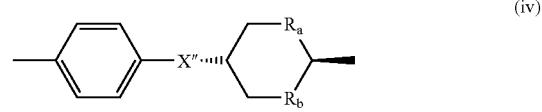

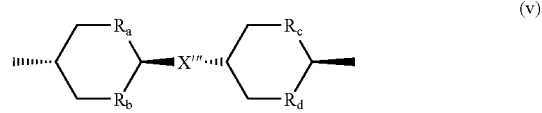

where X', X" and X'" are each selected from a direct bond, $C_{1-4}$ alkylene or $C_{2-4}$ alkenylene chain, and each group $R_a$, $R_b$, $R_c$ and $R_d$ are independently selected from $CH_2$ or oxygen.

3. A compound according to claim 2 wherein $R_a$, $R_b$, $R_c$ and $R_d$ where present, are $CH_2$ groups.

4. A compound according to any one of claims 1 to 3 wherein Y is oxygen.

5. A compound according to any one of claims 1 to 3 wherein n is 2.

6. A compound according to any one of claims 1 to 3 wherein X is directly bonded or a $C_{1-2}$ alkylene chain.

7. A compound according to claim 6 wherein X is a direct bond.

8. A compound according to any one of claims 1 to 3 wherein X is a $C_{2-4}$ alkenylene chain of formula (vi), (vii) or (viii).

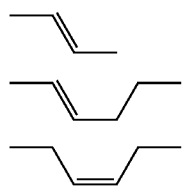

(vi)

(vii)

(viii)

9. A compound according to any one of claims 1 to 3 which is of formula (IA)

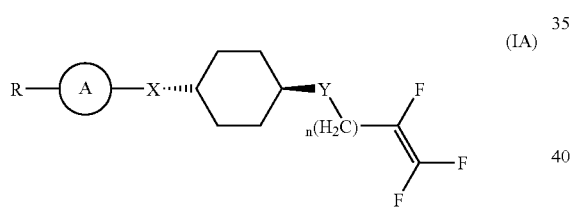

(IA)

where R is an alkyl or alkenyl group which is optionally interposed with one or more oxygen or sulphur atoms, Y is independently selected from oxygen or sulphur, n is an integer of from 2 to 8, X is a direct bond, $C_{1-4}$ alkylene or $C_{2-4}$ alkenylene, and A is group comprising of one or two rings, they are either bonded directly or by way of a $C_{1-4}$ alkylene or $C_{2-4}$ alkenylene group.

10. A compound according to any one of claims 1 to 3 wherein R is a straight chain $C_{1-6}$ alkyl group which optionally contains one or two oxygen or sulphur atoms.

11. A compound according to any one of claims 1 to 3 wherein R is a $C_{2-10}$ alkenyl group.

12. A compound according to claim 11 wherein the alkenyl group contains two double bonds.

13. A compound according to claim 11 wherein the alkenyl group is a diene of formula (ix)

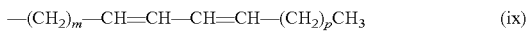

(ix)

where m and p are 0 or an integer of from 1-5, providing that m+p does not exceed 5.

14. A compound according to any one of claims 1 to 3 which is a compound of formula (II)

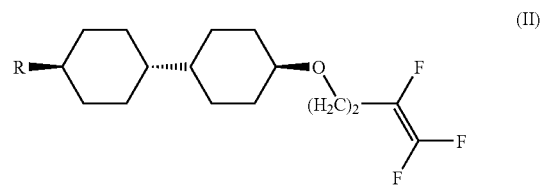

(II)

where R is an alkyl or alkenyl group which is optionally interposed with one or more oxygen or sulphur atoms.

15. A method for preparing a compound according to any one of claims 1 to 3 which comprises reacting a compound of formula (III)

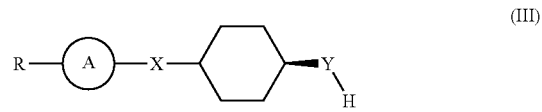

(III)

where R is an alkyl or alkenyl group which is optionally interposed with one or more oxygen or sulphur atoms, Y is independently selected from oxygen or sulphur, X is a direct bond, $C_{1-4}$ alkylene or $C_{2-4}$ alkenylene, and A is group comprising of one or two rings, they are either bonded directly or by way of a $C_{1-4}$ alkylene or $C_{2-4}$ alkenylene group; with a compound of formula (IV)

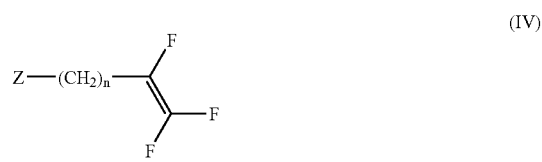

(IV)

where n is an integer of from 2 to 8 and Z is a leaving group.

16. A mixture comprising of a compound according to any one of claims 1 to 3 and another liquid crystal compound which may or may not comprise a compound of formula (I).

17. A liquid crystal device comprising a compound according to any one of claims 1 to 3 or a mixture according to claim 16.

18. A liquid crystal device which comprises a display cell comprising a layer of liquid crystal material wherein the liquid crystal material comprises a compound of formula (I) as defined in claim 1, means for addressing the liquid crystal material so as to allow light to pass through it when appropriately addressed, and an emitting layer comprising phosphor elements, arranged to receive light passing through the liquid crystal layer.

19. A liquid crystal device which comprises a display cell comprising a layer of liquid crystal material wherein the liquid crystal material comprises a mixture as defined in claim 16, means for addressing the liquid crystal material so as to allow light to pass through it when appropriately addressed, and an emitting layer comprising phosphor elements, arranged to receive light passing through the liquid crystal layer.

* * * * *